United States Patent [19]

Hartwell et al.

[11] Patent Number: 4,968,889
[45] Date of Patent: Nov. 6, 1990

[54] PULSER INJECTION WITH SUBSEQUENT REMOVAL FOR GAMMA-RAY SPECTROMETRY

[75] Inventors: Jack K. Hartwell; Scott G. Goodwin, both of Idaho Falls; Larry O. Johnson, Blackfoot; E. Wayne Killian, Idahoe Falls, all of Id.

[73] Assignee: The United States of America as represented by the United States Department of Energy, Washington, D.C.

[21] Appl. No.: 309,435

[22] Filed: Feb. 1, 1989

[51] Int. Cl.$^5$ .............................................. G01T 1/36
[52] U.S. Cl. ................................ 250/336.1; 250/369; 250/370.01
[58] Field of Search ............... 250/336.1, 270, 370.07, 250/370.01, 369

[56] References Cited

PUBLICATIONS

Johnson et al., "Utilization of Concurrently Gathered Pulser Data for . . . Validation of γ-ray Spectra . . . ", IEEE Trans. of Nuc. Sc. NS-28 (2/81).
Anders, "Experience with GE(Li) Det. . . . and a Practical Approach to Pulse Pileup . . . ", Nuc. Inst. & Meth., 68, p. 205 (1969).
Hartwell et al, "An On–Line Automated γ-Spectrometer for Coolant Monitoring at L.O.F.T.", IEEE Trans. on Nucl. Sc., NS-30 (1983).
Hartwell et al, "On-Line γ-Ray Data Acquis. at the Power Burst Facility", Nucl. Inst. & Meth. in Phys. Res., A242, p. 487 (1986).

Primary Examiner—Janice A. Howell
Assistant Examiner—Richard Hanig
Attorney, Agent, or Firm—Frank J. Kozak; Bradley W. Smith; William R. Moser

[57] ABSTRACT

An improved system for gamma-ray spectroscopy characterized by an interface module that controls the injection of electronic pulses as well as separation logic that enables storage of pulser events in a region of the spectrum of a multichannel analyzer distinct from the region reserved for storage of gamma-ray events. The module accomplishes this by tagging pulser events (high or low) injected into the amplification circuitry, adding an offset to the events so identified at the time the events are at the output of the analog to digital converter, and storing such events in the upper portion of the spectrum stored in the multichannel analyzer. The module can be adapted for use with existing gamma-ray spectroscopy equipment to provide for automatic analyses of radioisotopes.

10 Claims, 6 Drawing Sheets

PULSER INJECTION WITH SUBSEQUENT REMOVAL FOR GAMMA-RAY SPECTROMETRY

CONTRACTUAL ORIGIN OF THE INVENTION

The United States Government has rights in this invention pursuant to Contract No. DE-AC07-76ID01570 between the United States Department of Energy and EG&G Idaho, Inc.

BACKGROUND OF THE INVENTION

In gamma-ray spectroscopy, measurement of the spectra of electromagnetic radiation emitted by a sample, and in particular the measurement of the energy distribution of gamma rays, is used to determine the radioisotopes of a sample. Gamma-ray spectrometers are used at nuclear power plants and at laboratories such as the Radiation Measurements Laboratory (RML) at the Idaho National Energy Laboratory (INEL) operated by EG&G Idaho, Inc. for the U.S. Department of Energy. The RML provides essential radioanalytical services to the Advanced Test Reactor (ATR), waste management programs and other projects. If monitoring requirements in the nuclear industry become more stringent in the future, more emphasis will be placed on the calculation of detection limits and threshold values from spectra.

Remote spectrometers have been fielded to provide monitoring of effluents during destructive nuclear fuel testing, as described by J. K. Hartwell, E. W. Killian, E. B. Shingleton, E. E. Owen and R. J. Norris in "An On-Line Automated Gamma Spectrometer for Coolant Monitoring at the Loss of Fluid Test Facility (LOFT)", *IEEE Transactions on Nuclear Science*, NS-30 (1983) and Jack K. Hartwell and E. Wayne Killian, "On-Line Gamma-Ray Data Acquisition at the Power Burst Facility", *Nuclear Instruments and Methods in Physics Research*, A242, p. 487–492 (1986). On-line gamma-ray spectrometers can be operated remotely to view and quantify the fission products released when reactor fuel test bundles sustain severe damage.

Gammetric spectrometric measurements can be complicated by factors such as pile-up and dead time, especially when the sample produces a high count rate. One solution for this problem includes injecting electronic pulses into the amplification circuitry through which the pulses from the gamma-ray detector are processed. This technique of electronic pulse injection has found wide application in Ge detector gamma-ray spectrometry for dead time and pulse pileup loss correction and for calculation or stabilization of the system gain and zero. However, in the standard implementation, careful attention is required to position the pulser peak(s) in an uncluttered spectral region. This is especially difficult when dual amplitude pulse injection is used and limits this application to sources in which the spectrum is known or can be previously measured. Additionally, the elevated continuum encountered at low energies in high count-rate spectra can obliterate the pulser peak from a low amplitude pulser when a moderate injection rate is used. A technique suggested by O. U. Anders in "Experience With the Ge(Li) Detector for High Resolution Gamma-Ray Spectrometry and a Practical Approach to the Pulse Pileup Problem", *Nuclear Instruments and Methods*, 68, pages 205–208, 1969 includes storage of pulser events in regions of the gamma-ray spectrum forbidden to gamma-ray events. A technique for pulser injection with subsequent removal that relies on software storage of pulser events in special buffers separate from the gamma-ray spectral storage region is described by L. 0. Johnson, E. W. Killian, R. G. Helmer and R. A. Coates, in "Utilization of Concurrently Gathered Pulser Data for Complete Spectral Validation of Gamma-Ray Spectra From Germanium Detectors", *IEEE Transactions on Nuclear Science*, NS-28 (Feb. 1981). Previous implementations of this latter technique, i.e. pulser injection with subsequent removal, have required custom-designed multi-channel analyzers (MCA) using a NOVA computer, as described by Johnson, et al., supra. This latter technique provides for real time spectral data validation, spectrometer performance monitoring, and spectrum specific energy calibrations without interference with the spectral data.

As an example, during the destructive fuel testing mentioned above, the pulser-based corrections for gain and zero shift and for correction for pulse pileup and system dead time were essential for accurate results. However, the complexity of the fresh fission product spectra accumulated during these experiments precluded storage of the pulser peaks within the gamma-ray spectral region. During a destructive fuel test more than 600 gamma-ray spectra were acquired. Input rates generally ranged from a few hundred counts per second to well over 100,000 c/s.

There are other popular loss-free or virtual pulser techniques, such as the virtual pulser technique described by G. P. Westphal in "Real-Time Corrections of Counting Losses in Nuclear Pulse Spectroscopy", *Journal of Radioanalytical Chemistry*, 70, p. 387, 1982. The virtual pulser technique would be expected to have the significant advantage of a nearly unlimited pulser sampling rate when the system dead time is very high and counting times are restricted. However, the virtual pulser technique does not provide the spectrum specific energy and width calibration available using the equally convenient pulser injection with subsequent removal method.

Therefore it is an object of the present invention to provide a gamma-ray spectroscopy system that includes pulse injection that separates the pulse and gamma-ray events.

It is a further object of this invention to provide a gamma-ray spectrometer that can separate the pulse and gamma-ray events automatically.

It is another object of this invention to provide a module the can be readily and efficiently adapted to existing gamma-ray spectroscopy system equipment to accomplish accurate separation of pulse and gamma-ray events in the memory of the multichannel analyzer.

It is still another object of the invention to provide an interface between a pulse injector and a multichannel analyzer that separates the pulser data from the gamma-ray data automatically using digital logic.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is an improved system for gamma-ray spectroscopy characterized by a module that controls the injection of pulser events as well as separation logic that enables storage of pulser events in a region of the spectrum of a multichannel analyzer distinct from the region reserved for storage of gamma-ray events. The module accomplishes this by tagging pulser events (high or low) injected into the amplification circuitry, adding an offset to the events so identified at the time the events are at the output of the analog to digital converter, and storing such events in the upper portion of the spectrum stored in the multichannel analyzer. The module can be adapted for use with existing gamma-ray spectroscopy equipment to provide for automatic analysis of radioisotopes.

DETAILED DESCRIPTION OF THE INVENTION

The present invention uses a technique of pulser injection with subsequent removal from the gamma-ray spectrum that provides the benefits of pulser injection without the requirement for prior spectral definition. The present invention uses digital logic in a special pulser control and separation module to modify (or not modify) addresses in the analog to digital converter based on pulser tagging logic signals. This technique allows truly automatic and even unattended gamma-ray spectrometry.

Figure 1:
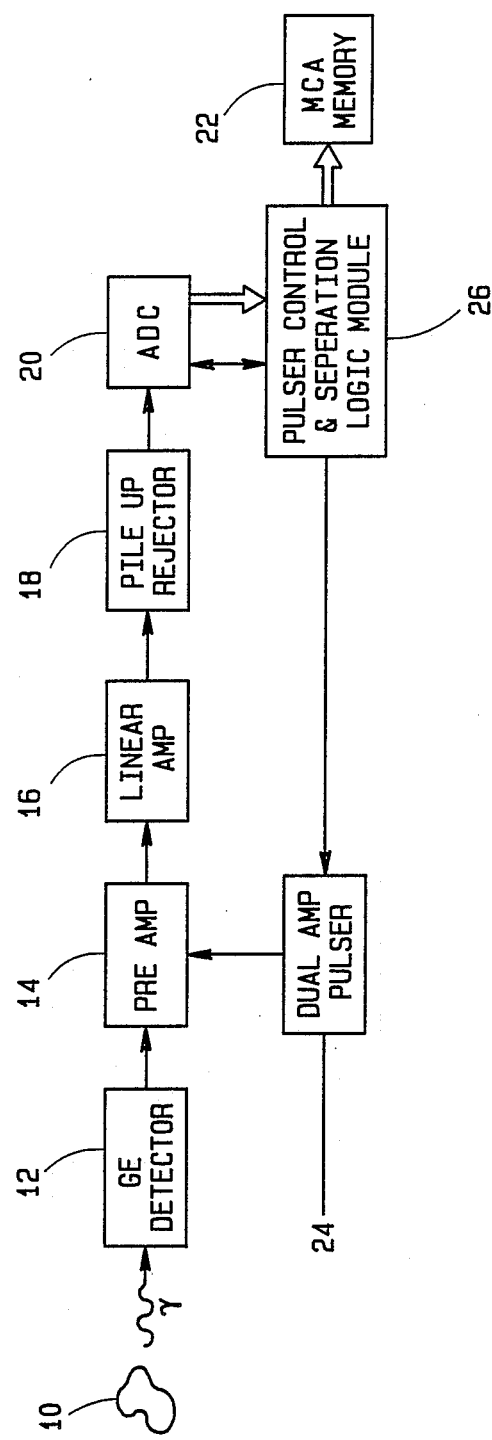
FIG. 1 is a functional block diagram of the present invention implemented on a gamma-ray spectrometer.

A functional block diagram of the present invention as incorporated in a spectrometry system is depicted in FIG. 1. Referring to FIG. 1, a sample 10 is positioned with respect to a germanium (Ge) detector 12 so that gamma rays from the sample are collected and converted to electrical signal pulses. These pulses (analogs of the gamma rays) are directed through electronic circuitry that includes a preamplifier 14, a linear amplifier 16, a pile-up rejector 18, and an ADC (analog to digital converter) 20. The pulses are stored in memory in the MCA (multichannel analyzer) 22.

The present invention achieves pulser injection with subsequent removal through the addition of two specially-built modules to a standard gamma-ray spectrometer. The first module is a highly stable, temperature compensated dual-amplitude pulser 24 that injects pulses into the test input of the Ge detector preamplifier 14. The dual-amplitude pulser 24 can be similar to the one described by Johnson, et al. supra. The second module is the PC&SL (pulser control and separation logic) module 26. PC&SL module 26 provides the dual functions of initiating the injection of pulser events and effecting the removal of the pulser events for storage in regions forbidden to gamma-ray events.

In the preferred embodiment, the PC&SL module 26 is an interface developed for use with the Canberra Series 90 multichannel analyzer and operated with a Canberra Model 8076 analog to digital converter. The Canberra Model 8076 analog to digital converter is remotely programmable, has 8192 channels and operates at 100 MHZ. The present invention is not limited to this particular type of equipment, however.

The standard Canberra 8076 analog to digital converter was modified to incorporate the PC&SL module 26 in the output of the analog to digital converter to the memory of the multichannel analyzer. To connect the PC&SL module 26 to the Canberra Model 8076, leads to the PC&SL module are inserted between the output address register and the address adders of the Model 8076. The completion of the output address timing chain in the ADC is delayed by holding off a timing signal until the manipulation of the pulser address is complete as further explained below.

Figure 2:
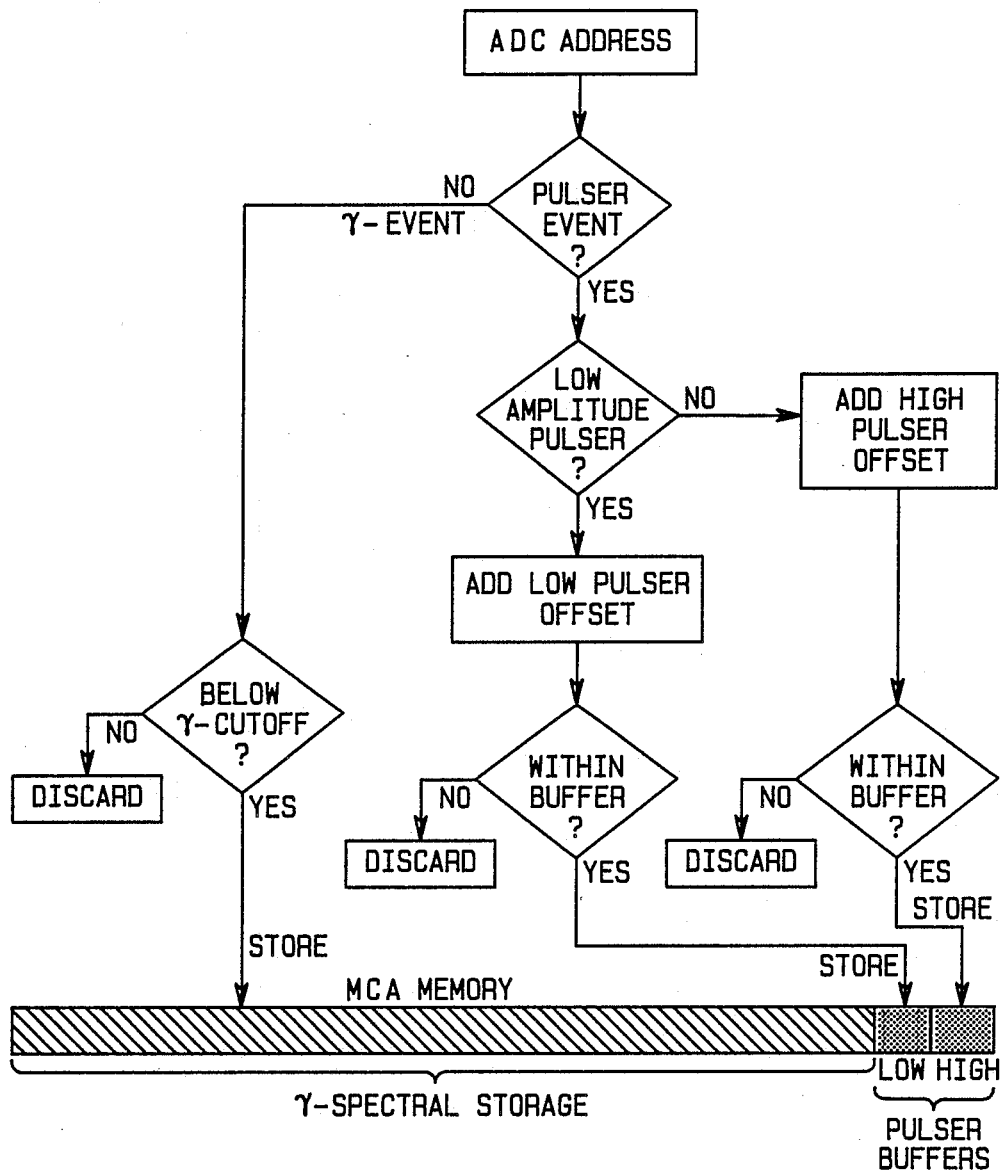
FIG. 2 is a functional diagram of the pulser separation logic module.
Figure 3:
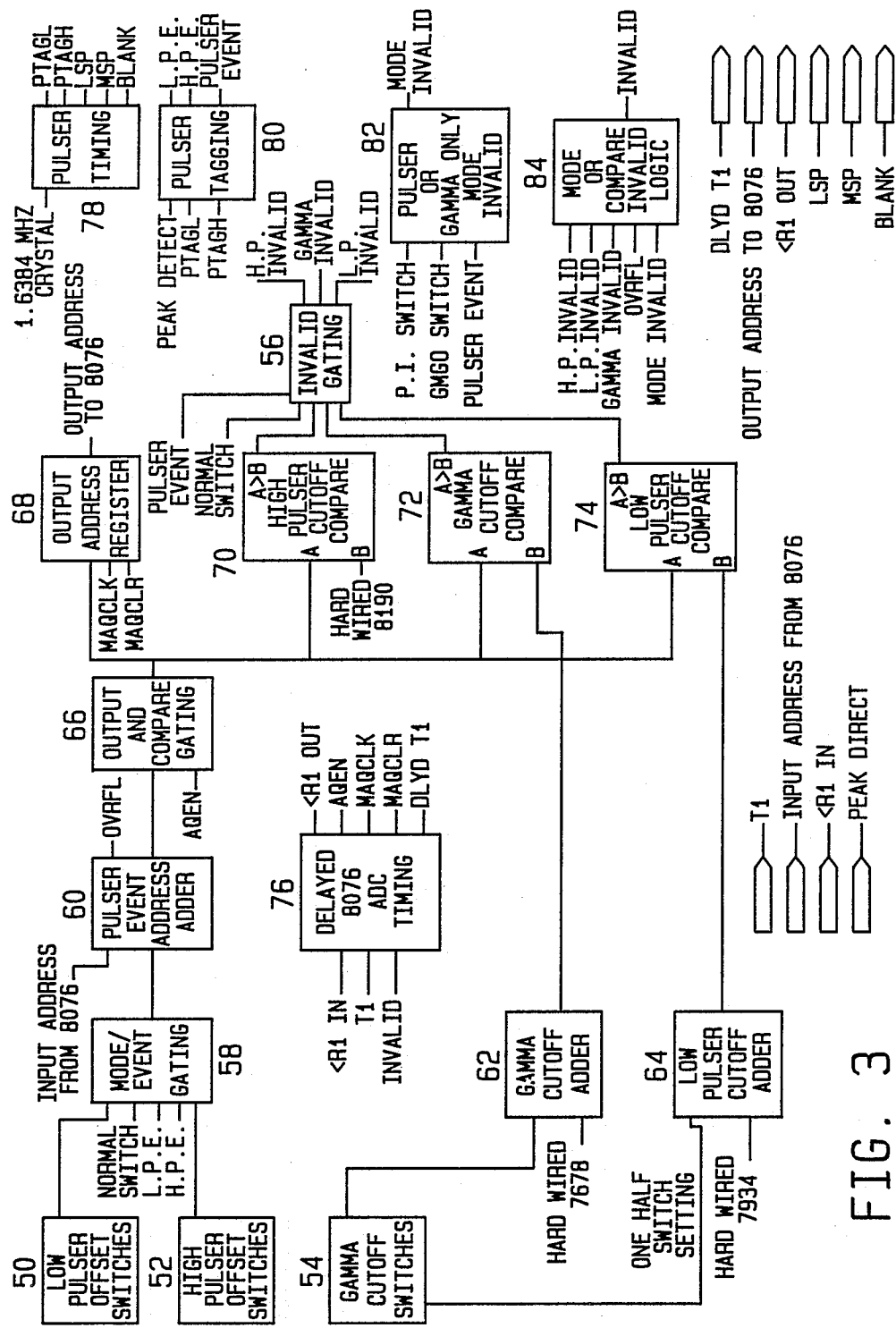
FIG. 3 is a block diagram of the pulse control and separation logic module.

The PC&SL module 26 will be described with reference to FIGS. 2 and 3. The PC&SL module 26 has two main functions: (1) pulse injection control, and (2) separation of events. With respect to the first function, the control portion of the PC&SL module 26 generates logic pulses used to trigger pulser event injection by the dual-amp pulser 24. In the preferred embodiment, a temperature compensated precision pulser is used which produces a low voltage analog pulse and a high voltage analog pulse which are injected into the preamplifier 14. This produces a simulated low energy peak into the lower third of the data channels of the MCA 22 while the other produces a high energy peak into the upper third of data channels of the MCA 22. Injected pulses are square topped in order to avoid baseline distortions in the shaping amplifier output at high gamma-ray input rates. (Tail pulse injection would result in a two pole response at the preamplifier output rendering accurate pole zero compensation of the shaping amplifier signal impossible.) A blanking signal is generated by the pulse injection logic that rejects any conversion by the analog to digital converter of the negative trailing edge pulse. The pulser rate, adjustable from 50 HZ to 3200 HZ for both the high and low pulsers, is produced in the PC&SL module 26 by a crystal controlled oscillator. The PC&SL module 26 tags each pulser event that is sent to the preamplifier 14 at ADC Start Convert time. This tag allows identification of pulser events during processing in the ADC. The standard pulse repetition rate is 100 pulses per second (50 high and 50 low). This moderate pulser repetition rate was selected to be consistent with recommended practices concerning desirable upper limits on the fractional dead time devoted to pulser processing. This practice is discussed by Alan E. Proctor in "An Implementation of the Pulse Injection Technique for Dead-Time and Pileup Corrections in Gamma Spectroscopy Suitable for Automated Systems", *Nuclear Instruments and Methods in Physics Research*, A256, p. 355–360 (1987) and M. Wiernik in "Normal and Random Pulse Generators for the Correction of Dead-Time Losses in Nuclear Spectrometry", *Nuclear Instruments and Methods*, 96, pages 325–329 (1971). Higher pulser repetition rates can be selected and are useful for extremely high input rate applications.

A pulser tagging signal is generated in conjunction with the leading edge of the "inject" signal and a blanking pulse is generated in conjunction with the trailing edge. The pulser tag is used to identify pulser events and further to identify high amplitude and low amplitude pulser events. The blanking pulse activates the analog to digital converter rejection circuitry in order to reject the negative pulse generated by the trailing edge of the injected square wave. Internal time delays allow compensation for pulse propagation through the analog system to the ADC input. Injected pulser events are processed through the analog signal processing electronics and digitized by the ADC 20 along with the gamma-ray events.

The pulsers are tagged by the pulser tagging module 80 clocking an event flag: Low Pulse Event is clocked by PTAGL and High Pulse Event is clocked by PTAGH, both from module 78. This occurs by using the Peak Detect signal from the ADC 20 when a pulser has been injected into the detector 12 at LSP or MSP time. BLANK feeds EXT REJ into the ADC to reject the negative pulse produced by the trailing edge of MSP or LSP.

The other main function of the PC&SL module 26 is the separation of events logic. In the preferred embodiment, the separation logic can operate in three modes: (1) the normal mode, (2) the pulse only mode, and (3) the gamma only mode. Operation of the PC&SL module in any of these modes can be operator selected.

Operation in the Normal Mode.

Operation in the normal (NORM) mode is considered the usual operational status of the PC&SL module. In normal mode, any pulser event, low or high, is identified, modified by addition of an offset value, and stored in a switch-selectable window in the spectrum in the memory of MCA 22. Any gamma-ray events in this window are rejected, all others are stored in the rest of the spectrum channels (0 - gamma cutoff value). In normal mode, the PC&SL module 26 intercepts the address output of the ADC 20 and establishes a gamma cutoff level above which gamma-ray events will not be stored. Gamma-ray events resulting in addresses below the gamma cutoff are not modified. Gamma-ray events resulting in addresses above the gamma cutoff are discarded. The gamma cutoff level is normally set for about the 8000th channel of an 8192 channel multichannel analyzer. This reserves about 95 channels for accumulation of each pulser peak and provides space for movement of the pulser peaks within each buffer in order to track any system gain and zero shifts. These wide pulser storage buffers also allow for the degradation in pulser peak resolution inherent at high system counting rates.

Injected pulser events are identified as low amplitude or high amplitude pulser events by the pulser tagging signals PTAGL and PTAGH, respectively. The PC&SL module 26 adds a specified digital offset to low and high pulser events to effect routing of the pulser pulses to their respective spectral storage regions above the gamma cutoff. In the preferred embodiment, the offset is adjustable and can be selected by switches on the front panel of the PC&SL module 26. If the event is a low pulser event then its address is tagged by PTAGL. An offset value, as set by Low Pulser Offset Switches 50 (called a Low Pulser offset) is added to this original address by the pulser event offset adder 60. The Low Pulse Offset is switch selectable from 6144–7679 channels. If the event is a high pulser event, then its address is tagged by PTAGH by module 78. An offset value, as set by High Pulser Offset Switches 52, (called a High Pulser offset) is added to the original address by the pulser event address adder 60. The High Pulser offset is switch-selectable from 0–2047 channels. In the preferred embodiment, offsets are 7312 channels and 894 channels for the low and high amplitude pulsers, respectively. If the event was a gamma-ray event no offset is added.

The resultant address is next presented to three separate comparators—the High Pulser cutoff compare 70, the Low Pulser cutoff compare 74, and the Gamma Cutoff compare 72—and to the output address register 68. This occurs at AQEN time. These comparators set the upper value of each pulser storage window (in channels) and also set the maximum channel number for gamma-ray event storage. The Gamma Cutoff comparator 72 checks to see if the gamma event address exceeds the gamma cutoff value. The gamma cutoff value is set by a front panel switches and is selectable from 7678–8186 channels. If a gamma-ray address exceeds the gamma cutoff value, it is rejected by the PC&SL module 26 using the <RIOUT signal (from module 76) to the ADC 20, no storage occurs, and the ADC 20 is cleared and is readied for another event. As a result, depending on the switch settings, gamma-ray events can store from 0 to 7678 through 8186. The spectral region above the gamma cutoff channel number is now reserved for low and high pulser event storage.

The Low Pulser cutoff comparator 74 checks to see if a low pulser event address exceeds its cutoff value. The same switches that select the gamma cutoff are used as well as a hard wired number 7934 to define the comparator value. However, the gamma cutoff selection switch range to the Low Pulser cutoff comparator 74 is one half the former range. This results in a low pulser cutoff value of 7934 plus one half the gamma cutoff selection switch value. If the low pulser event address exceeds its cutoff, it is rejected using the <RIOUT signal from module 76 to the ADC 20. The region above the low pulser cutoff is thus reserved for high pulser event storage.

The High Pulser cutoff comparator 70 checks to see if a high pulser event address exceeds its cutoff. This cutoff value is a hard wired number 8190. If a high pulser event address exceeds 8190, it is rejected using the <RIOUT signal from 76 to the ADC 20. Consequently, the high pulser event storage region is from channel 7934 plus one half gamma cutoff switches through channel 8190.

The PC&SL module 26 also checks for pileup addresses exceeding channel 8191. If a gamma and a low or high pulser event occurred at the same time it would be tagged as a pulser event. An offset would be added. This address could exceed 8191 in the pulser event address adder 60 and appear as a low numbered address. The PC&SL module 26 checks for this using the active 8192 bit, called OVRFL, in its pulser event address adder 60 as a condition of rejection. After passing the comparator without rejection, the event address (plus appropriate offset if a pulser event) is clocked into the output address register 68 by MAQCLK during AQEN. The MCA 22 then increments the addressed memory channel after DLYDT1 is sent back to ADC 20. MAQCLR is issued after DLYDT1 goes non-active to clear and set up the output address register 68 for the next event.

Another condition of rejection occurs on the front end of the ADC 20. When a square-topped pulser pulse is processed through the preamplifier 14 and linear amplifier 16, a bi-polar (+ −) signal results. PC&SL module 26 produces a signal called BLANK from 78 which controls EXT REJ to the ADC 20 during the negative portion of the signal and rejects the event. This occurs during Linear Gate time and no run down of the event occurs.

Operation in pulser only mode.

In pulser only mode, (PI), any pulser events are identified, not modified and stored in the normal spectrum channels (0–8190). Any gamma events are rejected and not stored. In the PI Mode, no offset is added. If an event is a pulser event, low or high, it passes through the interface without comparison to cutoff values. If the event is a gamma-ray event it is rejected in using <RIOUT from 76. Operation in the PI mode accumulates only pulser events in the full 8192 channel memory of MCA 22.

Operation in gamma only mode.

In gamma only mode, (GMGO), pulser events are identified, not modified and are rejected and not stored. Gamma-ray events are stored in the normal spectrum channels (0–8191). In the GMGO mode, no offsets are added. If the event was a pulser, low or high, it is rejected using <RIOUT from 76 and the ADC 20 is cleared. All gamma-ray events pass through and are stored in the full spectrum, 0–8191, without cutoff comparisons. In the GMGO mode, the gamma-ray spectrometer operates functionally as if the pulser injection with subsequent removal system was not installed.

Operation of the PC&SL module 26 relies on generation of a timing signal from the ADC 20. The signal T1 from ADC 20 triggers all processes in PC&SL module 26. After event run down, T1 goes active. T1 is intercepted; with the PC&SL module 26 establishing a timing between T1 and where T1 causes EOC to go active. T1 going active in the ADC 20 causes ADDEN to go active. After 500 nsec the address is stable and this data is at the pulser event address adder 60 of the PC&SL module 26. The data is added or not added to an offset address and the result is sent to the comparators and the output address register 68 at AQEN time. The address is compared by the three comparators and any invalid flags are set. At MAQCLK time, 200 nsec long, the address is latched into the output address register 68 if no invalid flags were set 84. T1 is allowed to go nonactive by DLYDT1 from 76 and the ADC address register latches the data. 100 nsec later MAQCLR clears the output address register 68 in the preparation for the next event. Also at this time in the ADC 20, EOC goes active which clears ADDEN and checks for invalid flags. DATARDY in ADC 20 is set on the trailing edge of EOC to clear all flags. The ADC is now ready for another event.

Figure 4:
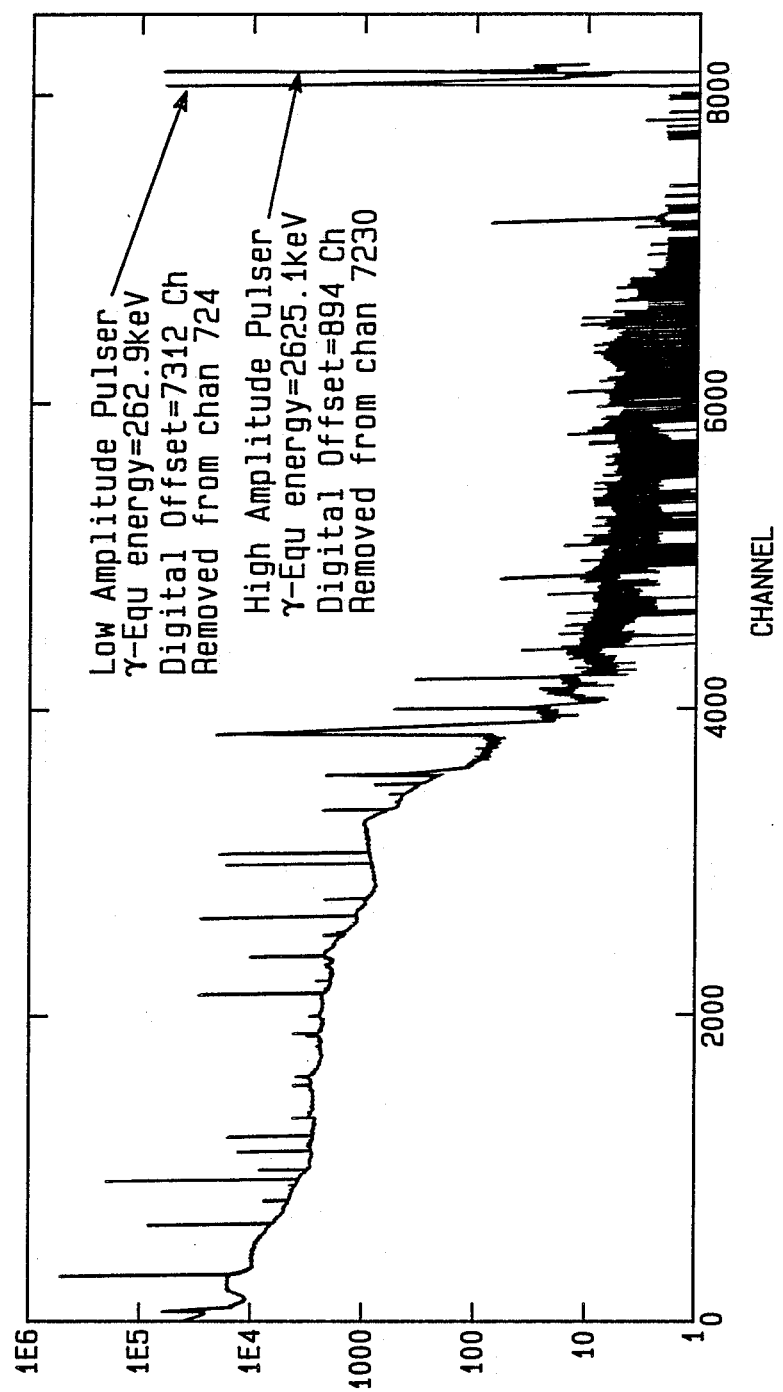
FIG. 4 is a chart of a gamma-ray spectrum with pulser peaks removed to buffers above channel 8000.

As a routine practice, pulser peak to gamma-ray energy equivalency values can be determined periodically (frequencies of once per month are more than adequate) using fairly standard energy calibration techniques. Depicted in FIG. 4 is a gamma-ray spectrum with injected pulsers moved to buffer regions above channel 8000.

Data stored in MCA memory 22 can be interpreted by existing software techniques. Such software techniques, implemented in conjunction with the INEL's GAUSS VIII and VAXGAP gamma-ray spectral analysis codes, derive spectrum-specific energy calibrations and random summation-corrected live times from the pulser data. These techniques are described by R. G. Helmer, M. H. Putnam and C. M. McCullagh in "Nuclide Activities Determined From Gamma-Ray Spectra From Ge Detectors: A Review with GAUSS VIII as the Example", *Nuclear Instruments and Methods in Physics Research*, A242, p. 427–436 (1986) and E. W. Killian and J. K. Hartwell in "VAXGAP: A Code for the Routine Analysis of Gamma-Ray Pulse-Height Spectra on a VAX Computer", EGG-2533, May 1988. Derivation of the energy calibration from the centroids of the upper and lower pulser peaks, the known digital offsets, and the previously determined pulser-to-gamma-ray energy equivalence values is straight forward. In most cases the calibration equation is quadratic in form and uses a quadratic term determined during pulser energy equivalence calibration. A width equation expressing the gamma-ray peak full width at half the maximum (FWHM) as a linear function of channel number is also derived during energy equivalence calibration.

During analysis of sample spectra, special routines are used to ensure proper calculation of each gamma-ray peak count rate. Random summation-corrected live times are derived from the area of the upper pulser peak using the method suggested by K. Debertin and U. Schotzig in "Limitations of the Pulser Method for Pile-up Corrections in Ge(Li)- Spectrometry", *Nuclear Instruments and Methods*, 140, p. 337, 1977. Debertin and Schotzig, supra, document the systematic errors that can be induced into pulser-based live time corrections by a mismatch between the fitting techniques used to fit the pulser peaks and the spectral gamma-ray peaks. These errors are introduced by the narrower width of the pulser peaks. To minimize these effects the VAXGAP and GAUSS VIII codes proceed as follows. Gamma-ray peak areas are determined by least-squares fitting of the spectral region to a Gaussian function. The pulser data in the upper pulser buffer are then convoluted with a unit area Gaussian function having the same width as the gamma-ray peak being calculated. The Gaussian-convoluted upper pulser peak is then fit by least squares techniques and the resultant area used along with the known pulser repetition rate to calculate the gamma-ray peak count rate. This process of convolution of the upper pulser peak to the gamma-ray peak width is repeated for each spectral peak to be fit.

In analysis codes used, the Gaussian width may be a fixed parameter during least-squares fitting, as described in the publication by R. G. Helmer, et al., supra and Killian, et al., supra. Consequently, accurate photopeak width predictions must be available from the width calibration equation. The width of the low amplitude pulser peak can be used to define the zero term of a linear width equation. The linear term of the width equation can be determined during energy equivalence calibration. Gamma-ray photopeak widths increase at elevated counting rates; however, so does the width of the low amplitude pulser peak. Modifying the zero term of the width equation based on the width of the low amplitude pulser peak provides usable width predictions over a wide counting rate range.

Performance characteristics of the system were tested using a set of 152 Eu sources prepared at INEL. Weight aliquoting techniques were used to prepare a set of 11 mounted point sources with precisely known activity ratios. Source activity ratios were known to better than 0.10% (estimated relative standard deviation). The highest activity source contained 563.871 (+ − 0.07%) times the activity of the lowest activity source. These sources allowed determination of the accuracy of count rate effects corrections at the major photopeak energies of $^{152}$Eu using the proportional source technique.

The measurement system consisted of an intrinsic Germanium detector with charge sensitive preamplifier. Signals from the temperature compensated pulser were injected into the preamplifier test input. The preamplifier output was routed to an ORTEC 672 amplifier and pileup rejector. The shaping was selected to be semi-Gaussian with a 2 $\mu$sec time constant. The secondary preamplifier output was routed to the input of an INEL-built fast amplifier and discriminator and the discriminator output scaled to provide (after correction for a known fixed time constant) the total input rate.

The multichannel analyzer was a Canberra Series 90 with an 8076 Wilkinson-type analog to digital converter. System conversion gain was 8192 and the gamma cutoff was set at channel 8003. Analog gain and pulser offsets were selected to center the pulser peaks in their respective buffers. Pulser energy equivalence, the quadratic term of the energy calibration equation, and the linear term of the width equation were established by counting a $^{228}$Th source and analyzing the 5 major peaks at 238.624, 583.174, 860.53, 1620.7, and 2614.476 keV using special software running as part of VAX-GAP, as described by E. W. Killian and J. K. Hartwell in "VAXGAP: A Code for the Routine Analysis of Gamma-Ray Pulse-Height Spectra on a VAX Computer", EGG-2533, May 1988. This calibration was done once just prior to the set of test runs.

Each of the 11 $^{152}$Eu sources was placed 10 centimeters from the detector end cap (on axis) and counted for 5000 live time seconds. (Gating of the system clock was provided from the ORTEC 672.) Input counting rates varied from 890 c/s to 177,000 c/s. All acquired spectra were transferred to the controlling VAX 750 and analyzed using the VAXGAP analysis code. VAXGAP is an automatic, menu driven code and no special attention or operator interaction was required to complete these analyses.

Figure 5:
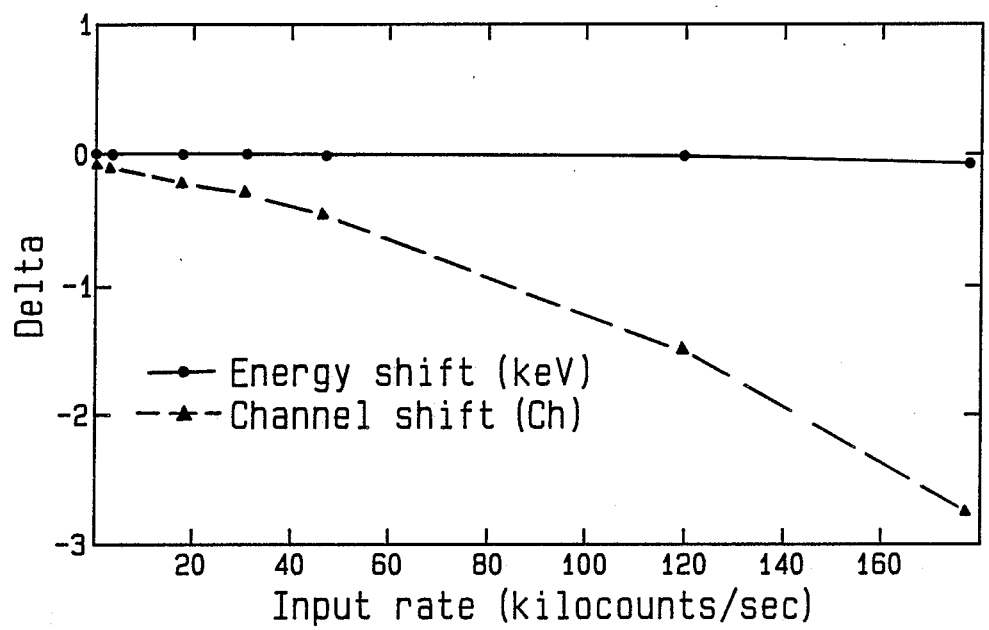
FIG. 5 is a chart comparing the 122.8 keV peak energy calculated from the injected pulsers with the peak centroid at various input rates.
Figure 6:
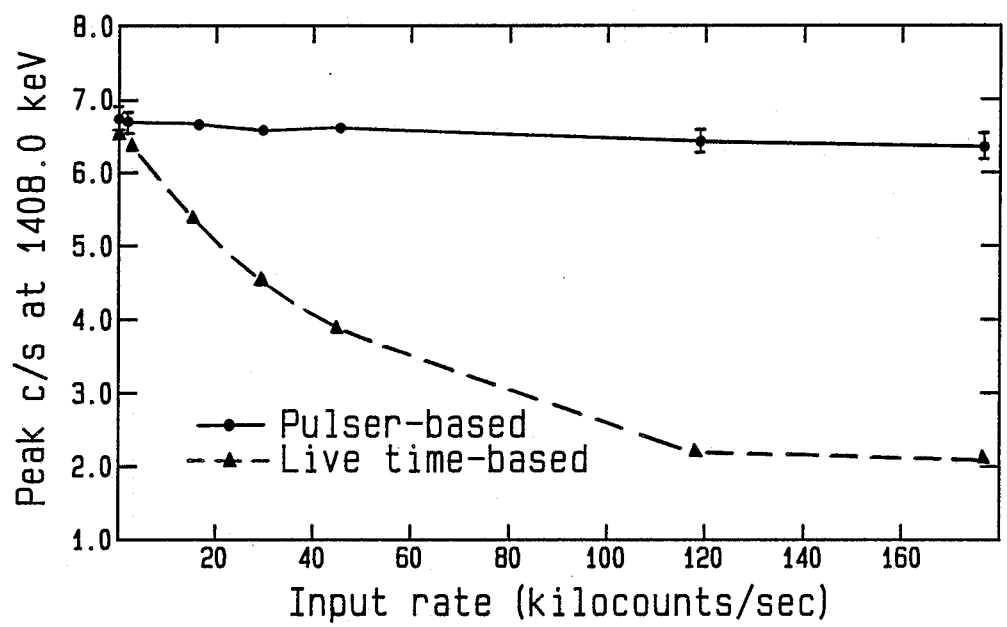
FIG. 6 is a chart comparing the normalized 1408 keV peak count rate calculated using the pulser data with that calculated using live time at various input rates.
Figure 7:
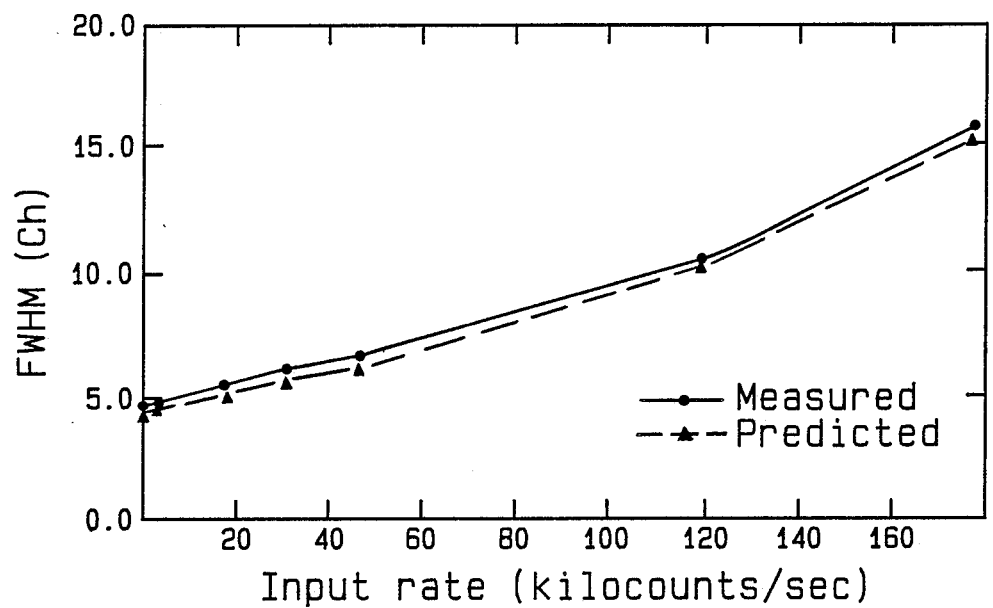
FIG. 7 is a chart comparing the measured width of the 122.78 keV peak with that predicted by a pulser-based algorithm.

FIGS. 5 through 7 graphically present results from this set of test measurements. The value of the spectrum-specific energy calibration provided by the dual pulser injection system is depicted in FIG. 5. FIG. 5 displays the centroid shift of the 122.78 keV line of $^{152}$Eu compared with the photopeak energy calculated from the pulser peak position as the input rate varied from 890 c/s to 177,000 c/s. As the input rate increased these spectra underwent a zero shift of about 3 channels (equivalent to about 1.1 keV); however, the pulser-based photopeak energy changed less than 0.2 keV.

The importance of the pulser-based calculation of the photopeak count rate is demonstrated in FIG. 6. The figure presents the calculated peak count rate in the 1408.0 keV peak of $^{152}$Eu as the input rate increased from 890 c/s to 177,000 c/s. Measured peak counting rates have been normalized by the known source activity ratios for meaningful comparison. The solid curve is the normalized peak count rate determined using the area of the convoluted upper pulser peak for summation and timing correction, while the dashed curve is the result of computations using the system live time. The error bars are two estimated standard deviations. The pulser-based corrections are within a few percent of the correct value over the full input rate range. The simple live time correlation fails at even moderate counting rates.

An additional parameter derived from the pulser data is the zero term of the width calibration equation. FIG. 7 compares the measured FWHM of the 122.78 keV $^{152}$Eu peak with that predicted using the FWHM of the lower amplitude pulser peak as the zero term of the width equation. While the correspondence is not exact, the pulser data certainly provides a width estimate at elevated input rates that is improved relative to the initial low counting rate value. Automatic or batch mode analysis codes that use fixed width fitting require these count-rate dependent peak width estimates.

The present invention allows truly automatic live time, pileup, and gain and zero shift correction. An operator is freed from the requirements of positioning the pulser peaks in an unused portion of the spectrum and from adjustment of the pulser repetition rate in order to avoid swamping of the lower pulser peak by the continuum at elevated counting rates. Implementation of this technique can allow the development of remote, unattended spectrometers and spectrometers for operation by untrained personnel and can increase the accuracy and throughput of environmental spectrometry systems.

Unattended spectrometers, operating under the complete control of a host processor in a central counting room and equipped with the present invention can monitor the stack effluent, liquid effluent, and primary coolant concentration of a reactor on-line and in real time. Spectra can be automatically accumulated and analyzed and results stored, without routine operator intervention. In addition to the contribution of this invention to the post-acquisition analysis of the spectral data, the accumulation of interference-free pulser peaks within known buffer regions can allow real time inspection of the system stability during data acquisition. For example, a controlling computer can interrogate the pulser storage regions and subtract the current contents from the contents found the previous minute. The residual values, representing pulser events collected in the last minute, can be inspected and the pulser peak centroids and widths compared with those obtained at the start of the count to detect system shifts. This feature can be used to notify operators of gain and zero shifts that occur during counting of environmental level samples in order to avoid devoting long counting times to a spectrum spoiled by a system gain or zero shifts.

The embodiments of the invention in which an exclusive property or privilege is claimed are defined as follows:

1. A module for use with a gamma-ray spectroscopy system, the system including a gamma-ray detector for detecting gamma-ray events and producing a signal representing the gamma-ray events, a converter responsive to the detector and capable of converting the signal to a spectrum, a storage memory responsive to the converter and capable of storing the spectrum at address locations in memory, and a pulser capable of injecting pulses into the signal produced by the detector, the module comprising:
means for generating a logic pulse for controlling the pulser, said controlling means adapted for coupling to the pulser,
means for generating separation of events logic to isolate the components of a combined gamma-ray - pulse spectrum, said separation of events logic means adapted for coupling to the converter and the storage memory with the capability of storing pulses at address locations in the storage memory separate from the gamma-ray events, means for receiving an initiating signal from the converter to generate a plurality of operations by said module, means for tracking variations in a gamma-ray - pulse spectrum brought on by external parameter changes, and means for interfacing with commercially developed gamma-ray spectrometry equipment.

2. The module of claim 1 in which the pulser is capable of producing low and high pulses and further in which said means for controlling pulses includes means for tagging pulses as low or high pulses.

3. The module of claim 2 in which said separation of events logic includes:

comparison means capable of distinguishing gamma-ray events, low pulses, and high pulses, means for offsetting low pulses with a low pulser offset, and means for offsetting high pulses with a high pulser offset different from the low pulser offset.

4. A gamma-ray spectroscopy system that includes a detector that can produce a signal representing the incidence of gamma-rays on said detector, means for amplification of the signal wherein the amplification means is coupled to the detector, a pulser capable of producing pulse signals, the pulser coupled to the amplification means, an analog to digital converter coupled to the amplification means, the converter capable of producing a spectrum from the signals conveyed from the detector and the pulser via the amplification means, and a multichannel analyzer with storage memory linked to the analog to digital converter, the multichannel analyzer being capable of storing the spectrum representing gamma-rays and the pulsers at addresses in storage memory, an improvement comprising: a module coupled to the analog to digital converter, the multichannel analyzer and the pulser, said module including means for initiating the injection of pulser events by the pulser, means for separating the pulser events from the gamma-ray events means for storing pulser events in the memory of the multichannel analyzer in a region of addresses forbidden to gamma-ray events, means for storing gamma-ray events in the memory of the multichannel analyzer in a region of addresses forbidden to pulser events, and means for receiving a signal from the analog to digital converter to initiate a plurality of operations from said module.

5. The improvement of claim 4 in which said means for initiating injection includes:

means for initiating injection of low pulses and high pulses, and means for tagging low pulses and high pulses.

6. The improvement of claim 5 in which said interface includes:

comparison means responsive to the analog to digital converter, said comparison means capable of distinguishing gamma events, low pulses, and high pulses, and means for adding responsive to said comparison means, said means for adding capable of adding a low offset to low pulses and a high offset to high pulses.

7. The improvement of claim 6 in which said interface further includes:

a cutoff value, and means for detecting pileup responsive to said means for adding, said means for detecting pileup capable of rejecting addresses that exceed said cutoff value.

8. A method for gamma-ray spectrometry comprising the steps of:

detecting gamma-ray events, producing a signal representing the gamma-ray events, injecting high pulser events and low pulser events into the signal representing the gamma-ray events, generating logic pulses to trigger a pulser event, converting the signal containing the gamma-ray events and high and low pulser events into a spectrum, storing the spectrum in memory with the pulser events stored in an address region of the memory forbidden to the gamma-ray events, generating an initiating pulse coupled to the generation of the logic pulses, and tracking changes in the signal resulting from changes in external parameters.

9. The method of claim 8 including the steps of:

tagging the low pulser events with a low pulser tag, and tagging the high pulser events with a high pulser tag.

10. The method of claim 9 including the steps of:

comparing the gamma-ray events, low pulser events, and high pulser events, and offsetting the low pulser events with a low pulser offset, offsetting the high pulser events with a high pulser offset different from the low pulser offset, whereby the gamma-ray events, the low pulser events, and the high pulser events can be stored in the separate address regions of the memory.

* * * * *